United States Patent [19]

Gupta et al.

[11] Patent Number: 4,506,851

[45] Date of Patent: Mar. 26, 1985

[54] DRAIN APPARATUS FOR AIRCRAFT

[75] Inventors: Alankar Gupta, Renton; Robert W. Jenny, Bellevue; Frank L. Malone, Black Diamond, all of Wash.

[73] Assignee: The Boeing Company, Seattle, Wash.

[21] Appl. No.: 307,038

[22] Filed: Sep. 30, 1981

[51] Int. Cl.³ .................... F16K 31/122; F16K 17/36; B64C 1/00

[52] U.S. Cl. ................................ 244/129.1; 137/244; 137/81.1; 251/63.6; 98/1.5

[58] Field of Search .................. 91/442; 137/244, 498, 137/505.13, 517, 81.1; 244/1 R, 129.5, 129.1, 129.4; 251/63, 63.6

[56] References Cited

U.S. PATENT DOCUMENTS

| | | | |
|---|---|---|---|
| 2,614,885 | 10/1952 | Roell et al. | 137/244 |
| 2,672,085 | 3/1954 | Fischer | 137/81.1 |
| 3,194,143 | 7/1965 | Wood | 98/1.5 |
| 3,268,269 | 8/1966 | Treillet | 251/63 |
| 3,476,141 | 11/1969 | Tillman | 137/498 |
| 3,556,444 | 1/1971 | Kopp | 244/135 R |
| 3,572,356 | 3/1971 | Pinto | 137/81.1 |
| 3,618,626 | 11/1971 | Russo | 137/498 |
| 3,675,674 | 7/1972 | Brown | 137/244 |
| 3,740,905 | 6/1973 | Adams | 244/119 |
| 4,054,156 | 10/1977 | Benson | 251/63.6 |
| 4,216,793 | 8/1980 | Volgstadt et al. | 251/63 |

Primary Examiner—George L. Walton
Attorney, Agent, or Firm—Lynn H. Hess; Bernard A. Donahue; Nicolaas DeVogel

[57] ABSTRACT

A drain structure for facilitating the draining of liquid condensate from inside an aircraft whenever air pressures inside and outside the aircraft are substantially equal. A pressure-sensitive apparatus is provided in conjunction with a drain opening through the aircraft's outer skin so that liquid can pass through the drain opening only while the apparatus is open. The apparatus includes a housing and a valve in the form of a slider movable within the housing to open and close the apparatus in response to the pressure differential between the inside and the outside of the aircraft. The housing defines a liquid passageway between the inside of the aircraft and the drain opening, and the slider closes the apparatus by blocking this liquid passageway whenever there is a substantial pressure differential between the inside and the outside of the aircraft. In opening and closing the apparatus the slider moves through both the liquid passageway and the drain opening so that the drain structure is kept free of debris which might otherwise interfere with operation of the slider or the draining of liquid.

12 Claims, 7 Drawing Figures

U.S. Patent   Mar. 26, 1985   Sheet 2 of 2   4,506,851
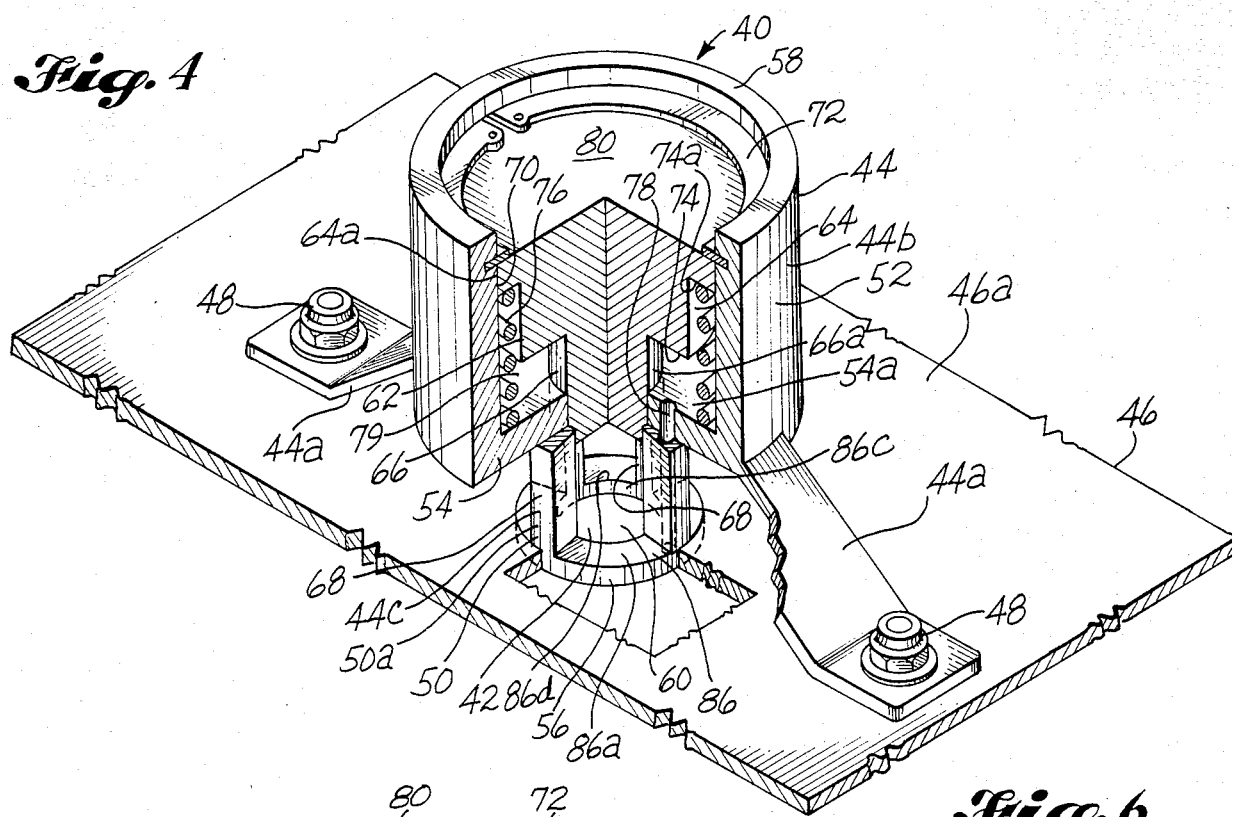
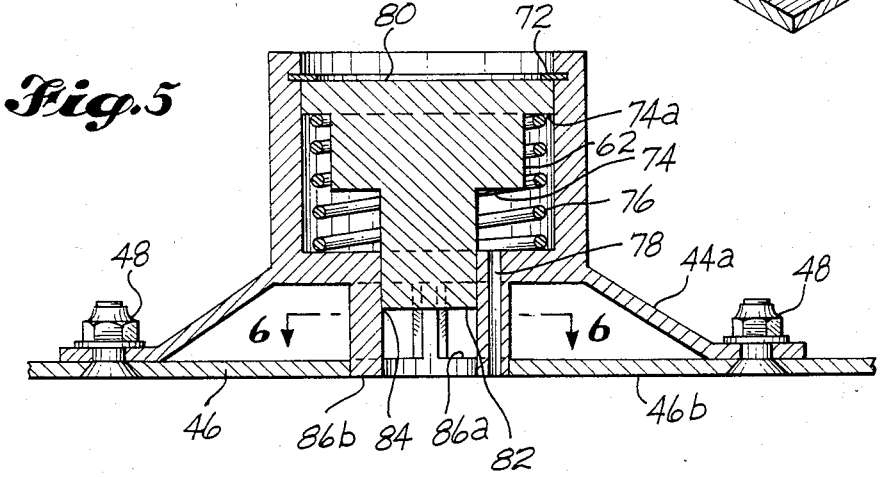
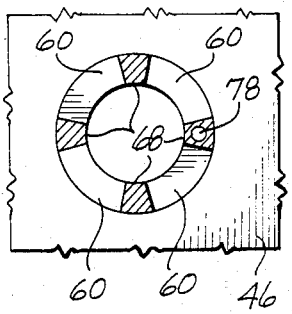
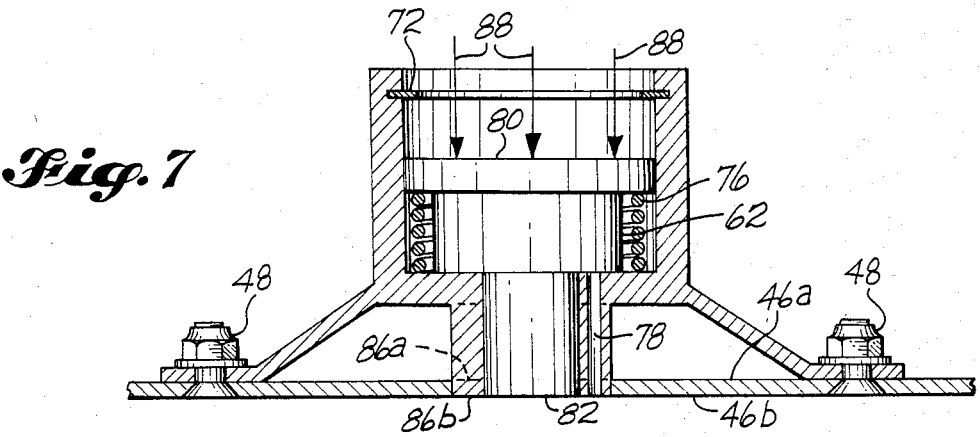

DRAIN APPARATUS FOR AIRCRAFT

BACKGROUND OF THE INVENTION

This invention relates to drain structures for aircraft.

During flight the cabin of a commercial aircraft will generally be pressurized, and temperatures outside the aircraft will be substantially lower than those inside. These differences in temperature and pressure between the inside of the aircraft and the ambient are necessary to protect cargo and ensure the comfort and safety of passengers and crew.

In most cases the outside walls or skin of a commercial aircraft are thermally insulated and sealed against fluid leakage so that the temperature and pressure within the aircraft fuselage may be efficiently maintained within permissible limits. As a result, there will usually be a substantial quantity of liquid condensate produced within the fuselage during a flight, and this liquid can present a serious problem if not properly disposed of.

One method of dealing with liquid condensate accumulated within the aircraft fuselage during a flight involves draining any such liquid from the fuselage through appropriately located drains. Since the aircraft fuselage must remain sealed while the cabin is pressurized, the drains must be easily opened and closed. Drains which open and close automatically in response to changes in the pressure differential between the inside and the outside of the fuselage may be designed to be self-sealing whenever the cabin is pressurized and to allow discharge of liquid condensate immediately upon cabin depressurization.

Although such drains have the advantage of requiring little or no attention from flight crew personnel, experience has shown that debris from inside the cabin tends to find its way to these drains and interfere with their operation. This debris will frequently clog the individual drains and may both interfere with drainage when the drain is open and interfere with closing of the drain when the cabin is pressurized.

Thus a drain apparatus is needed which will not only open and close automatically but will also be self-cleaning.

SUMMARY OF THE INVENTION

It is therefore an object of the present invention to provide a self-cleaning drain structure for an aircraft which is responsive to changes in the air pressure differential between the inside and the outside of the aircraft fuselage for automatically opening when the cabin of the aircraft is depressurized, automatically closing when the cabin is pressurized, and automatically clearing debris from the drain apparatus upon each such closing.

In accordance with the invention, a self-cleaning drain structure is provided which includes a drain opening through the aircraft's outer skin, a housing mounted on the outer skin over the drain opening to provide a passageway to the drain opening, and a valve mounted within the housing for movement between an open position clear of the passageway and a closed position blocking the passageway. The valve automatically moves between its open and closed positions in response to changes in the differential air pressure on opposite sides of the aircraft's outer skin, holding its closed position in the presence of at least a predetermined pressure differential and maintaining its open position in the absence of such a predetermined differential. The valve cooperates with the housing to clear debris from both the passageway and the drain opening whenever the valve moves to its closed position.

The novel features which are characteristic of the present invention, and other objects and advantages thereof, will be better understood from the following detailed description and the accompanying drawings which together disclose the presently preferred embodiment of the invention.

BRIEF DESCRIPTION OF THE DRAWINGS

FIG. 4 is an enlarged perspective view of the drain valve shown in FIG. 3 with portions broken away, FIG. 5 is a cross-sectional view of the drain valve shown in FIG. 3, FIG. 6 is a sectional view taken along line 6—6 in FIG. 5, and FIG. 7 is another cross-sectional view of the drain valve shown in FIG. 3.

DESCRIPTION OF THE PREFERRED EMBODIMENT

Figure 1:
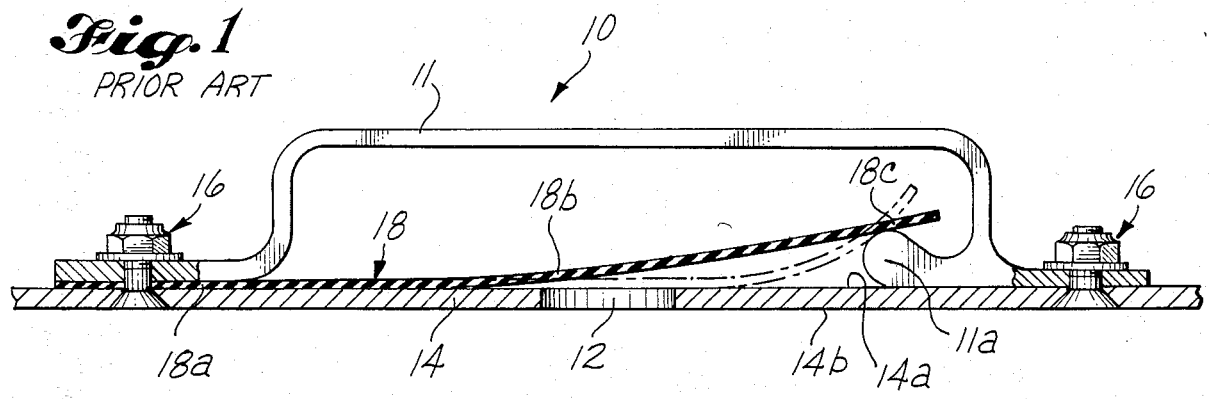
FIG. 1 is a cross-sectional elevation view of one type of drain valve for an aircraft.
Figure 2:
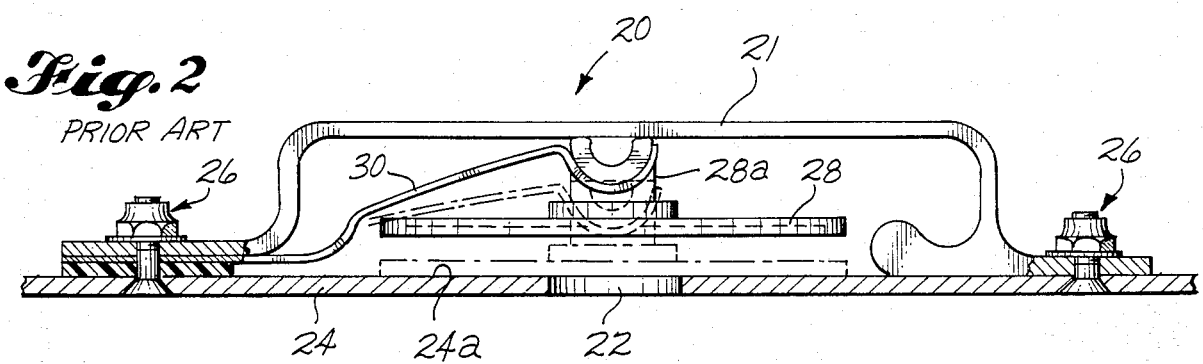
FIG. 2 is a cross-sectional elevation view of another type of drain valve for an aircraft.

The prior art drain apparatus shown in FIGS. 1 and 2 have been used in aircraft but have not proven entirely satisfactory. The drain apparatus 10 shown in FIG. 1 comprises a bracket 11 mounted over a drain opening 12 in an aircraft outer skin 14 by means of mechanical fasteners 16. A flapper valve 18 is held fast at one end 18a between opposing portions of the bracket and the outer skin. An intermediate portion 18b of the valve 18 covers drain opening 12, and a second end portion 18c of the valve rests against a lip portion 11a of the bracket.

With the cabin of the aircraft depressurized, the air pressure on side 14a of outer skin 14 (inside the aircraft) is substantially equal to the air pressure on side 14b of the outer skin (outside the aircraft), and the valve 18 is sufficiently stiff so that valve portion 18b will be spaced from the aircraft skin adjacent drain opening 12. This space will allow liquid condensate accumulated on side 14a of the outer skin 14 to be discharged from the aircraft through the drain opening.

However, when the cabin is pressurized the air pressure on side 14a of the outer skin will be substantially greater than the ambient air pressure on side 14b, and this difference in air pressure and resultant air flow around valve 18 and through opening 12 will cause valve 18 to distort to the closed position shown by broken lines in FIG. 1. The pressure differential between opposite sides of the outer skin will hold portion 18b of the valve tight against side 14a of the outer skin adjacent the drain opening and thereby seal the drain opening to prevent the passage of fluids therethrough. Thus with the drain apparatus 10 in its closed position liquid condensate accumulated adjacent the drain opening will not be allowed to drain from the aircraft, nor will the pressurized atmosphere inside the aircraft be depleted through the drain opening.

Upon depressurization of the aircraft cabin the valve 18 will return to its undistorted open position allowing liquid condensate accumulated while the drain apparatus was closed to be discharged through drain opening 12.

The prior art drain apparatus 20 shown in FIG. 2 operates in a similar manner. Drain apparatus 20 comprises a bracket 21 mounted over a drain opening 22 in aircraft outer skin 24 by means of mechanical fasteners 26. A valve 28 of nylon or the like includes a stem portion 28a by which it is attached to one end of a spring arm 30, and the other end of spring arm 30 is fixed between opposing portions of bracket 21 and outer skin 24. The valve 28 is positioned by arm 30 over drain opening 22, and spring arm 30 is biased away from opening 22 so as to tend to hold drain apparatus 20 in an open position with stem portion 28a resting against bracket 21 as shown in FIG. 2.

With the cabin of the aircraft depressurized air pressure inside the aircraft will be substantially equal to the ambient air pressure outside, and drain apparatus 20 will maintain its open position allowing liquid condensate inside the aircraft to be discharged through opening 22. When the cabin is pressurized a pressure differential will be created between opposite sides of outer skin 24 which will cause airflow past valve 28 and through opening 22, generating a net force against the valve sufficient to overcome the spring force applied by arm 30. The valve will thus be moved to a closed position in contact with inside surface 24a of the aircraft skin 24 as shown by broken lines in FIG. 2. Of course, upon depressurization of the aircraft the spring bias of arm 30 will return valve 28 to its open position.

It has been found that the flapper valve of the drain apparatus shown in FIG. 1 tends to stick in its closed position and that the drain opening tends to become plugged. Furthermore, the the use of corrosion inhibitor compounds may aggravate problems with this drain apparatus by accelerating deterioration of the silicone rubber material from which flapper valve 18 is made; and debris may tend to build up in the wedge-shaped space between the flapper valve and the inside surface of the aircraft skin. Obviously if the drain apparatus sticks in its closed position or cannot close tightly because of debris buildup it will not function properly.

Although the drain apparatus shown in FIG. 2 alleviates the sticking problem experienced with the FIG. 1 apparatus, it does little to avoid the buildup of debris adjacent the drain opening. Consequently, with the FIG. 2 apparatus debris may be compacted between the valve 28 and inside surface 24a of the aircraft skin and thereby both prevent the valve from closing tightly and interfere with drainage when the valve is open.

Figure 3:
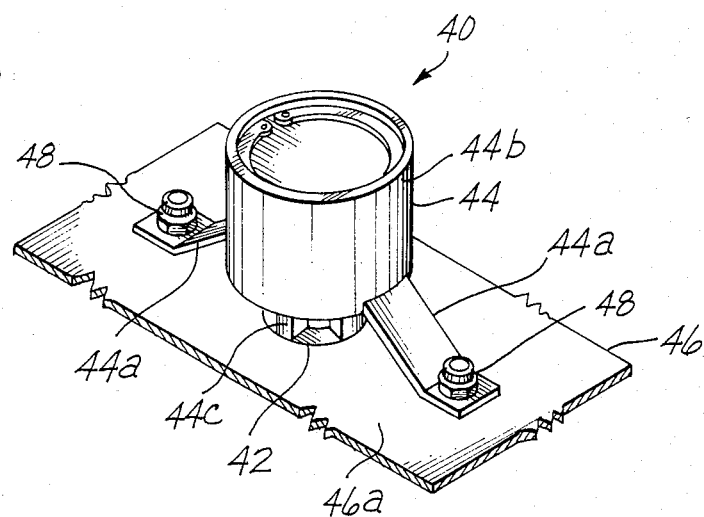
FIG. 3 is a perspective view of a drain valve in accordance with the present invention.

The self-cleaning drain apparatus in accordance with the present invention generally avoids these difficulties. This new drain apparatus 40, as shown in FIG. 3, includes a drain opening 42 and a housing 44; and the housing includes leg portions 44a, a cylinder portion 44b, and a passageway portion 44c. The leg portions 44a are fixed to the outer skin 46 of an aircraft by any convenient expedient such as mechanical fasteners 48 which may take the form of bolts, rivets, or the like.

Leg portions 44a of the housing 44 serve to locate and mount the housing on aircraft outer skin 46 with the end of passageway portion 44c of the housing fitting into drain opening 42. This arrangement, with a portion of housing 44 extending into opening 42, insures that the housing will be properly located relative to drain opening 42. This arrangement may also facilitate the provision of a fluid seal at the drain opening between the housing and skin 46. The housing is, of course, attached to an inside surface 46a of outer skin 46, and no part of drain apparatus 40 extends beyond the outside surface of the outer skin.

Referring now to FIG. 4, the drain apparatus 40 is shown in more detail. As seen in FIG. 4, the housing 44 of drain apparatus 40 includes a first sidewall 50 and a second sidewall 52 joined together by an intermediate wall portion 54. The sidewall 50 partially defines a first chamber within portion 44c of the housing, and sidewall 52 cooperates with wall portion 54 to define a larger second chamber within portion 44b of the housing. These first and second chambers include open end portions 56 and 58 respectively; and, in addition, the sidewall 50 includes an intermediate portion 50a which defines a plurality of openings or apertures 60.

The apparatus 40 also includes a valve in the form of a piston or slider 62 which is slidably mounted within the housing 44, and the piston 62 includes a body portion 64 and a stem portion 66. The stem portion 66 includes a side surface 66a for slidably engaging inside surfaces 68 of housing sidewall 50, and body portion 64 includes a side surface 64a for slidably engaging an inside surface 70 of housing sidewall 52. The sliding engagement between side surface 64a and inside surface 70 provides an effective fluid seal between the housing and the piston.

A snap ring 72 is provided at the open end 58 of housing 44, and this snap ring acts as a stop to limit upward movement of piston 62 as seen in FIG. 4. The piston also includes a surface portion 74 facing a surface 54a of housing 44, and surfaces 74 and 54a are engagable to limit downward movement of the piston. A spring 76 is retained inside the second chamber of housing 44 by contact with the surfaces of the piston and housing as seen FIG. 4, and the spring 76 serves to bias piston 62 to movement towards end 58 of the housing and tends to hold the piston in an open position against snap ring 72.

The housing 44 includes an air passageway 78 through portion 44c and intermediate wall portion 54 of the housing, and this air passageway allows ambient air outside the aircraft to enter the chamber 79 formed within cylinder portion 44b of the housing between piston 62 and walls 52 and 54 of the housing. The piston 62 also includes a surface 80 exposed to the atmosphere inside the aircraft, and the end of stem portion 66 of the piston defines an end surface portion 82 exposed to the atmosphere within the chamber defined by passageway portion 44c of the housing. The circumference of the piston's end surface 82 is defined by an edge 84 which may take the form of a cutting edge.

The end of housing portion 44c which extends into drain opening 42 defines a collar 86 including an inside surface 86a substantially coplanar with surface 46a of the aircraft skin, an outside surface 86b substantially coplanar with the outside surface 46b of the aircraft skin, a center surface 86c, and an inside circumferential edge 86d.

The self-cleaning drain apparatus is shown in FIG. 5 with its valve, piston 62, in the open position, and is shown in FIG. 7 with valve 62 in the closed position. The valve is moved against the force of spring 76 from an open to a closed position by the net force of air pressures against the various surfaces of the valve when the aircraft cabin is pressurized, and the valve is returned to its open position by the force of spring 76 when the cabin is subsequently depressurized.

It will be noted that with the cabin pressurized there will be a pressure differential across piston 62 notwithstanding the flow of air through the drain apparatus 40. Surface 80 of the piston will be exposed to cabin pressure, surfaces 74 and 74a of the piston will be exposed, via air passageway 78, to ambient pressure, and surface 82 will be exposed to something less than cabin pressure while the valve is open and to ambient pressure once the valve is closed. Air passageway 78 also insures that no air will be trapped within chamber 79 to interfere with the closing of the valve 62 and insures that ambient air may enter chamber 79 to avoid the creation of a vacuum which could interfere with the opening of valve 62 when the aircraft's cabin is depressurized.

Arrows 88 in FIG. 7 indicate the direction of net applied force acting on piston 62 as a result of the air pressure differential between opposite sides 46a and 46b respectively of outer skin 46 when the aircraft cabin is pressurized. It will be noted that while piston 62 is being thus held in its closed position the surfaces 82 of the piston, 86b of the housing, and 46b of the aircraft skin are substantially coplanar or flush with one another so as to present a generally smooth and even surface to air flow around the outside of the aircraft and thereby insure but little if any interference from the drain apparatus with the aerodynamic performance of the aircraft during flight. By the same token, housing 44 is mounted to outer skin 46 such that surfaces 86a and 86b of collar 86 are substantially coplanar with surfaces 46a and 46b respectively of the aircraft outer skin regardless of the position of piston 62, and since no part of collar 86 extends above surface 46a the collar will not interfere with the draining of liquid through drain opening 42 when the piston is in its open position as seen in FIGS. 4 and 5.

Any debris, such as hair or paper or the like, which collects in the area of housing portion 44c of the drain apparatus 40 might be expected to interfere with drainage through apertures 60 and also to interfere with a proper closing of the drain apparatus. Of course, if piston 62 cannot properly close in response to a pressurization of the aircraft cabin then apertures 60 and drain opening 42 may not be entirely blocked by stem portion 66 of the piston, and air inside the pressurized cabin will leak out through the drain opening.

This undesirable situation, however, is prevented by the self-cleaning action of the drain apparatus as it closes. Thus, as piston 62 moves from its open to its closed position end surface 82 will push debris adjacent drain opening 42 on through the opening and opposing edge portions 84 and 86d of the stem and collar respectively will cooperate to cut or sever large pieces of debris which cannot be entirely pushed through the drain opening. The debris pushed through the drain opening will be carried away from the aircraft by the flow of air along surface 46b of the aircraft outer skin.

In operation the drain apparatus 40 will be held open, as seen in FIG. 5, by spring 76 while the aircraft is on the ground prior to flight. When the aircraft cabin is pressurized after takeoff the buildup of cabin pressure relative to ambient air pressure outside the aircraft and in chamber 79 will create a net force against piston 62 as indicated by arrows 88 in FIG. 7, and this net force will cause the piston to move against the force of spring 76 to the closed position shown in FIG. 7 while air within chamber 79 will escape through air passageway 78. Once piston 62 has achieved its closed position it will be held closed as long as the cabin remains pressurized relative to the ambient air outside the cabin.

In moving from the open to the closed position end surface 82 of piston stem portion 66 will force debris adjacent the drain passageway through the drain opening, and any debris too large to be forced in its entirety through drain opening 42 will be severed by opposing cutting edges 84 and 86d of the piston and housing respectively and the portion of debris within the chamber formed by sidewall 50 of the housing will be forced through the drain opening. In this way valve 62 will not be prevented by the presence of even large amounts of debris from achieving a fully closed position entirely blocking the drain passageway.

During flight, while the cabin of the aircraft remains pressurized, liquid condensate will form inside the cabin at various locations along the outside of the aircraft fuselage as a result of high humidity inside the aircraft and the relatively cooler outside ambient temperatures. This liquid will tend to accumulate at various collection points within the fuselage, and at least one drain apparatus 40 will normally be located at each such collection point.

While the aircraft is making its descent for landing the cabin will gradually be depressurized, and the pressure differential between the inside and outside of the aircraft thus gradually eliminated. When the pressure differential has decreased sufficiently, spring 76 will force piston 62 back to the open position; and air from outside the aircraft will move through passageway 78 to fill the consequently increased volume of chamber 79. As the piston moves to its open position stem portion 66 is withdrawn from its blocking position relative to apertures 60 and drain opening 42, and the previously collected liquid condensate will drain through the passageway portion of the housing and the drain opening. This draining of liquid will occur rapidly since most debris was cleared from the drain apparatus during the closing thereof, and draining should be completed prior to actual landing of the aircraft.

The drain apparatus hereinabove described may be provided at numerous appropriate locations anywhere within that portion of the aircraft which is pressurized during flight. These devices can be designed, by varying the spring force and dimensions of the piston, to operate over a range of pressure differentials as desired. The drain apparatus should close in response to a relatively large and rapid pressure change such as would normally be experienced during pressurization of the aircraft cabin, and should remain closed in the presence of a moderate or relatively large pressure differential.

The foregoing description of our invention discloses preferred embodiments thereof, and various changes in form or detail may be made within the scope of the invention which is defined and limited only by the following claims.

We claim:

1. In an aircraft having a pressurizable compartment enclosed by an outer skin defining an outer surface exposed to atmospheric pressure and in interior surface exposed to compartment pressure, a self-cleaning drain apparatus comprising:

a drain opening through said outer skin;

a housing mounted to said interior surface of said outer skin and covering said drain opening, said housing including passage means defining a passage entrance opening flush with said interior surface and exposed to said compartment pressure for allowing liquid to pass through said housing;

valve means mounted within said housing for movement between an open position and a closed position, said valve means blocking said passage means in said closed position to prevent fluid from passing through said drain opening;

means for automatically moving said valve means between said open and said closed positions in response to changes in the air pressure differential between said outer and interior surfaces of said outer skin caused by the pressurization or depressurization of said compartment; and means for automatically clearing debris from said passage means and said drain opening in response to the movement of said valve means from said open to said closed position.

2. In an aircraft as claimed in claim 1 wherein said housing includes a collar portion extending into said drain opening and defining a portion of said passage means, said collar includes a first edge portion, and said valve means includes an end surface and a second edge portion, said means for automatically clearing debris from said passage means comprising said end surface and said first and second edge portions such that said end surface moves through said collar portion to force debris adjacent said drain opening through said drain opening while said first and second edge portions cooperate to sever debris being forced through said drain opening from debris outside said drain opening.

3. In an aircraft as claimed in claim 1 wherein said valve means includes a first end portion defining a first end surface which is substantially coplanar with said outer surface of said outer skin adjacent said drain opening with said valve means in said closed position.

4. In an aircraft as claimed in claim 1 wherein said housing includes a collar defining a portion of said passage means, said collar extending into said drain opening and including an outer surface substantially coplanar with said outer surface of said outer skin.

5. In an aircraft as claimed in claim 1 wherein said housing includes a collar extending into said drain opening and defining a portion of said passage means, said collar defining an inwardly facing surface having a circumferential edge portion adjacent and in substantially the same plane as said interior surface of said outer skin adjacent said drain opening.

6. In an aircraft as claimed in claim 1 wherein said housing defines a chamber and said valve means defines a first surface exposed only to compartment pressure and a second surface exposed only to the pressure within said chamber, said housing including a passageway from said chamber to said outer surface whereby the pressure inside said chamber is maintained at substantially atmospheric pressure.

7. A self-cleaning drain valve for use in an aircraft having a pressurizable compartment enclosed by an outer skin defining a drain opening, an outer surface exposed to atmospheric pressure, and an interior surface exposed to compartment pressure; the drain valve comprising:

a housing including a sidewall defining a chamber between open first and second ends of said housing, said sidewall further defining a liquid passageway adjacent said first end;

mounting means for facilitating the mounting of said housing to said interior surface of said outer skin over said drain opening with said first end adjacent said drain opening and said liquid passageway opening flush with said interior surface and exposed to said compartment pressure; and valve means mounted within said chamber for automatic movement between a closed position at said first end and an open position at said second end, said movement of said valve means in response to changes in the air pressure differential between outer and interior surfaces of said outer skin caused by the pressurization or depressurization of said compartment, and said valve means blocking said liquid passageway in said closed position and automatically removing debris from said liquid passageway when moving from said open to said closed position.

8. A self-cleaning drain valve as claimed in claim 7 wherein said first end of said housing includes a collar portion for extending into said drain opening and defining a portion of said liquid passageway, said collar includes a first edge portion, and said valve means includes an end surface and a second edge portion, said valve means automatically removing debris from said liquid passageway when moving to said closed position by causing said end surface to move through said collar portion to force debris adjacent said liquid passageway through said liquid passageway and causing said first and second edge portions to cooperate in severing debris being forced through said liquid passageway from debris outside said liquid passageway.

9. A self-cleaning drain valve as claimed in claim 7 wherein said valve means cooperates with said housing to define a separate chamber portion within said housing, said valve means defining a first surface exposed only to air pressure within said chamber portion and a second surface exposed only to air pressure at said second end of said housing, said housing including an air passageway for providing substantial air pressure equalization between said chamber portion and said first end of said housing.

10. In an aircraft having a pressurizable compartment enclosed by an outer skin defining an outer surface exposed to atmospheric pressure and an interior surface exposed to compartment pressure, a self-cleaning drain apparatus comprising:

a drain opening through said outer skin;

a housing including first and second chambers defined by first and second sidewalls respectively, said first and second chambers each including an open end portion and said first sidewall including an apertured intermediate sidewall portion, the end portion of said first chamber extending into said drain opening, said apertured sidewall portion defining a passage entrance opening flush with said interior surface and exposed to said compartment pressure for allowing liquid to pass through said housing and through said drain opening; and a piston slidably mounted in said housing for automatic movement between an open position and a closed position in response to changes in the air pressure differential between said outer and interior surfaces of said outer skin caused by the pressurization or depressurization of said compartment, said piston including a body portion slidably engaging said second sidewall in fluid-sealing relation therewith and a stem portion slidably engaging said intermediate sidewall portion and blocking the aperture in said intermediate sidewall portion with said piston in said closed position, said stem portion including an end surface portion for forcing debris through said first chamber, and said aperture and said stem portion including opposing edge portions for severing debris and thereby allowing said stem portion to move past said aperture.

11. In an aircraft as claimed in claim 10 wherein said body portion of said piston includes a first surface exposed only to an air pressure outside said second chamber which is substantially equal to compartment pressure and an oppositely facing second surface exposed only to the pressure inside said second chamber, said housing including air passage means for connecting said second chamber to said outer surface such that the pressure within said second chamber is maintained at substantially atmospheric pressure.

12. In an aircraft as claimed in claim 11 wherein said drain apparatus includes spring means for biasing said piston towards said open position such that said piston maintains said closed position only in the presence of a predetermined minimum differential air pressure between outer and interior surfaces of said outer skin.

* * * * *